United States Patent [19]
Richardson

[11] 3,825,223
[45] July 23, 1974

[54] CONNECTING PLUG FOR TESTING TUBES AND WITH INTERNAL VALVE THEREIN

[75] Inventor: William D. Richardson, Palos Heights, Ill.

[73] Assignee: Tuthill Pump Company, Palos Heights, Ill.

[22] Filed: Sept. 20, 1972

[21] Appl. No.: 291,389

Related U.S. Application Data

[63] Continuation-in-part of Ser. Nos. 231,332, March 2, 1972, Pat. No. 3,727,952, and Ser. No. , , which is a continuation-in-part of Ser. No. 54,288, July 13, 1970, abandoned.

[52] U.S. Cl............................. 251/149.6, 285/101
[51] Int. Cl............................................. F16l 37/28
[58] Field of Search........... 251/149.1, 149.6, 149.7, 251/149.8, 149.9; 137/614.03; 285/277, 101, 316

[56] References Cited
UNITED STATES PATENTS

| | | | |
|---|---|---|---|
| 2,850,298 | 9/1958 | Clark | 285/277 X |
| 3,195,935 | 7/1965 | Beebee | 137/614.03 X |
| 3,291,442 | 12/1966 | Cranage | 285/101 X |
| 3,464,436 | 9/1969 | Bluning | 251/149.1 X |
| 3,500,859 | 3/1970 | Pearson | 251/149.8 X |
| 3,650,507 | 3/1972 | Nyberg | 251/149.6 |

*Primary Examiner*—William R. Cline
*Attorney, Agent, or Firm*—Mann, Brown, McWilliams & Bradway

[57] ABSTRACT

An easily manipulable tube connector for connecting tubing to test equipment and the like wherein the connector has gripping means for gripping a tube therein and an internally movable plunger which is sealed to the tube being tested. The plunger moves axially within the connector when a tube is being sealed thereto and in the course of that movement opens a valve within the plunger for exposing the tube to a pressure passage.

8 Claims, 3 Drawing Figures

CONNECTING PLUG FOR TESTING TUBES AND WITH INTERNAL VALVE THEREIN

BACKGROUND OF THE INVENTION

This application is a continuation-in-part of my copending application Ser. No. 231,332, filed on Mar. 2, 1972, now U.S. Pat. No. 3,727,952 which application is a continuation-in-part of my earlier application Ser. No. 54,288, filed July 13, 1970, and now abandoned.

This invention pertains to a tube connector for connecting equipment utilizing thin-wall conduit, tubes or other types of components, such as found in refrigeration apparatus which must be subjected to high pressure test before it can be put into service. In pretesting of such equipment, on an assembly line basis or on a basis where the equipment is already installed, it is necessary to be able to connect the equipment to the testing apparatus and this must be done quickly and easily. The herein disclosed invention pertains to an easily manipulatable tube connector which, in a specific exemplary embodiment, is adapted to grip a conduit or tube fitting of the equipment to be tested and open a valve within the connector during inserting movement of a conduit therein, whereby communication to testing equipment is established through the connector.

The present invention utilizes a pair of jaw-like collet members actuated upon relative movement of a sleeve and head member for gripping a tube as disclosed in my aforementioned applications.

The present invention includes a plunger axially movable within the connector and the outer end of this plunger is adapted to receive a tube to be tested in a sealing relation. As the tube is moved into a sealing relation with the plunger, it causes an axial movement of the plunger within the connector. The plunger is formed with an internal bore cooperating with a valving element within the plunger so that when the plunger moves axially, the valve opens, thus establishing communication through the plunger and to the tube being tested. When the tube being tested is moved from the plunger, the plunger moves relative to the valve element to close the passage through the plunger.

The valve element, according to one embodiment of the invention, is provided with an extended outer portion which is received within the tube being tested for the purpose of opening a valve within the tube being tested (as, for example, a Schrader valve). In this embodiment two valving actions are involved, namely opening of the valve through the plunger and opening of the valve within the tube being tested.

DESCRIPTION OF THE PREFERRED EMBODIMENTS

Like elements are designated by like characters throughout the specification and drawings.

Figure 1:
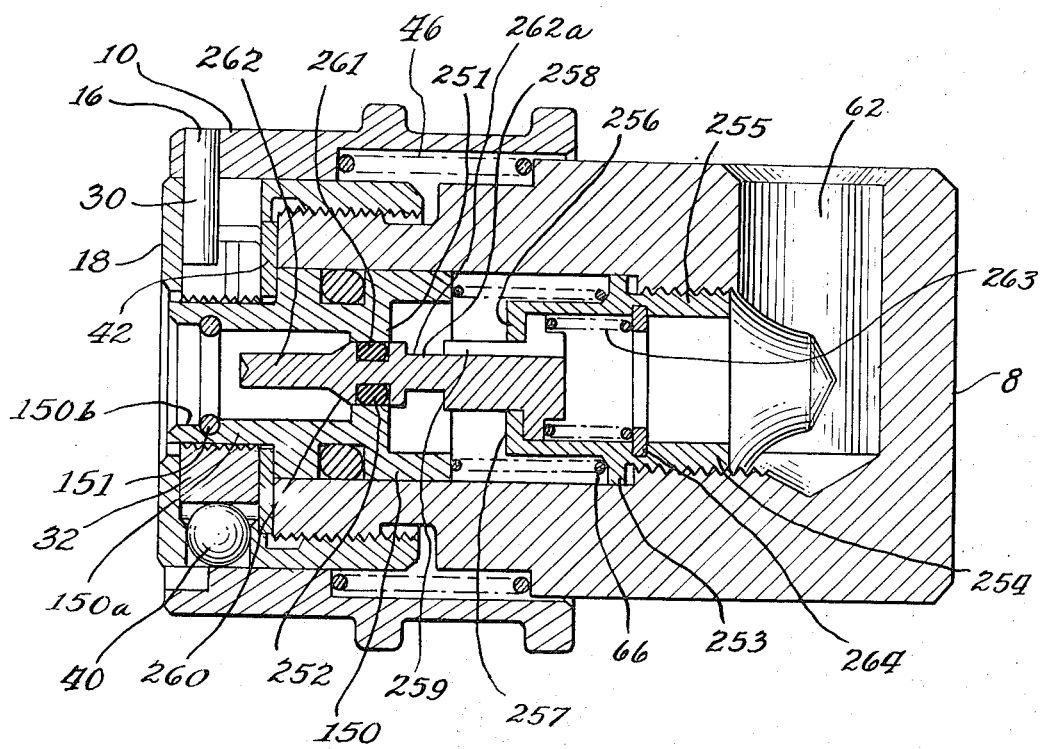
FIG. 1 is a sectional view of a tube connector embodying the principles of the present invention.
Figure 2:
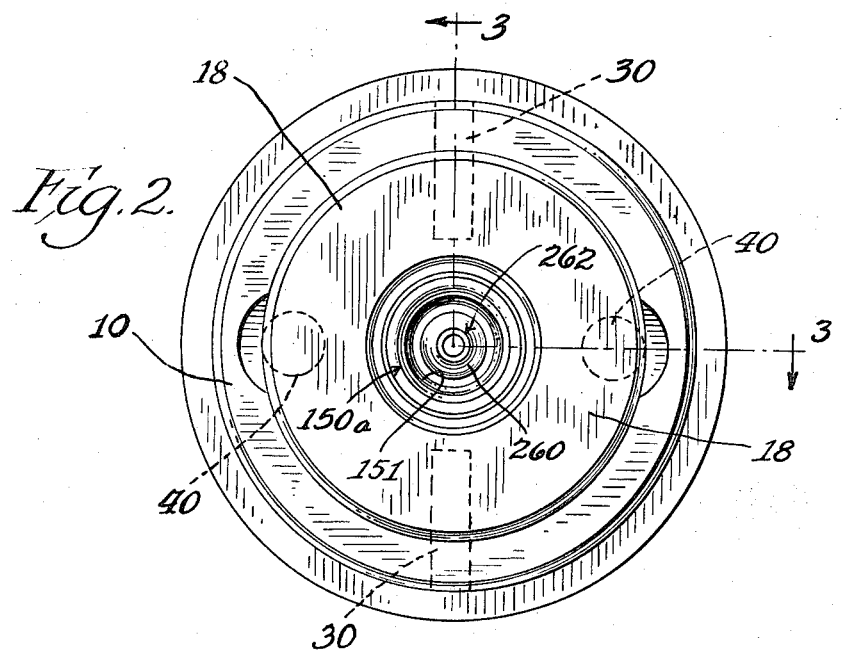
FIG. 2 is an end view of the connector illustrated in FIG. 1.

With specific reference now to the drawings, and in the first instance to FIG. 1, the present invention utilizes a head member defined by a tube receiving section 18 and a second section 8 as disclosed in my aforesaid applications. Section 18 is fixed to section 8 by a screw-threaded connection. A sleeve 10 surrounds the forward, tube receiving end of the head member and is adapted for axial movement relative thereto against the bias of a spring 46. Pins 30 are positioned in apertures 16 in the sleeve and move in slots in section 18, which slots provide a limit of movement of the sleeve 10 relative to the head member. A plurality of arcuately formed collets 32 are formed around the tube receiving opening in the head member and are adapted for radial movement inwardly and outwardly with respect to the head member in spaces between a guide ring 42 and a forward flange on section 18.

A plurality of balls 40 are forced by the sleeve 10, when sleeve 10 is in the position in FIG. 1, into engagement with the collets 32 to force them radially inwardly into a tube gripping position. Sleeve 10 has an internal stepped configuration provided by an inner diameter which forces the balls 40 against the collets and a larger outer diameter which allows the balls 40 to retract. When sleeve 10 is moved to the right, as in FIG. 1, the balls 40 may move away from the collets to release the grip on a tube.

As disclosed in said applications, sleeve 10 is moved to the right as in FIG. 1, to allow insertion of a tube to be tested within the connector. When the tube is positioned within the connector, sleeve 10 may be released, thereby forcing balls 40 aganst the collets 32 to the grip tube. As shown in the drawings, the parts are dimensioned to receive a tube of Shrader valve type which has a stepped end portion as disclosed in the aforementioned patent.

Head section 8 is hollow and carries an internal plunger 150 which is adapted to communicate the interior of the tube with a passage 62 of section 8 which is subjected to a source of fluid under pressure.

The plunger 150 within the head member may be formed in a manner similar to that disclosed in my application Ser. No. 231,332. For example, plunger 150 is slidably received in a bore in the head member and includes a reduced portion 150a extended within the outer tube receiving end of head section 18 and through and beyond ring 42 (in the tube gripping position thereof). The plunger is biased toward the open end of the head section by a spring 66.

Reduced portion 150a has a counterbore 150b axially aligned with actuating pin 258. An O-ring 151 is seated in a groove in the internal wall of the counterbore 150b. Seal ring 151 is adapted to seal against the exterior wall of a valve or tube being tested. In the expanded position of the parts, as illustrated in FIG. 1, all of the counterbore 150b and O-ring are positioned outwardly beyond the end of an actuating pin 258 which is carried within the plunger 150.

When a tube is to be tested, the tube is inserted in the forward end of the plunger 150 with the sleeve 10 retracted toward the right in the unlocked position. The tube will move within the plunger 150 until seal ring 151 contacts the exterior wall of the tube. As the tube moves within and against the plunger 150, it forces the plunger to the right, to expose collets 32 to the exterior surface of the tube, whereupon sleeve 10 can be released so that it moves outwardly whereupon the collets 32 will grip the outer wall of the tube.

According to the present invention, plunger 150 includes a central intermediate wall 251 having a bore 252 therein to form a valve seat for a purpose which will be described. The biasing spring 66 for the plunger is seated against the inner end of the plunger and against an annular abutment 253 of a specially formed retainer 254. Retainer 254 is threaded into the wall of a bore 255 which opens to passage 62. The abutment 253 may abut against a shoulder around this bore to establish a limit position for the retainer 254. The end of the retainer 254 closest to the plunger 150 includes a transverse wall 256 having a bore 257 for receiving the valve actuating pin 258. Actuating pin 258 is formed with a slot 259 to allow communication between the spaces on opposite sides of wall 256.

Figure 3:
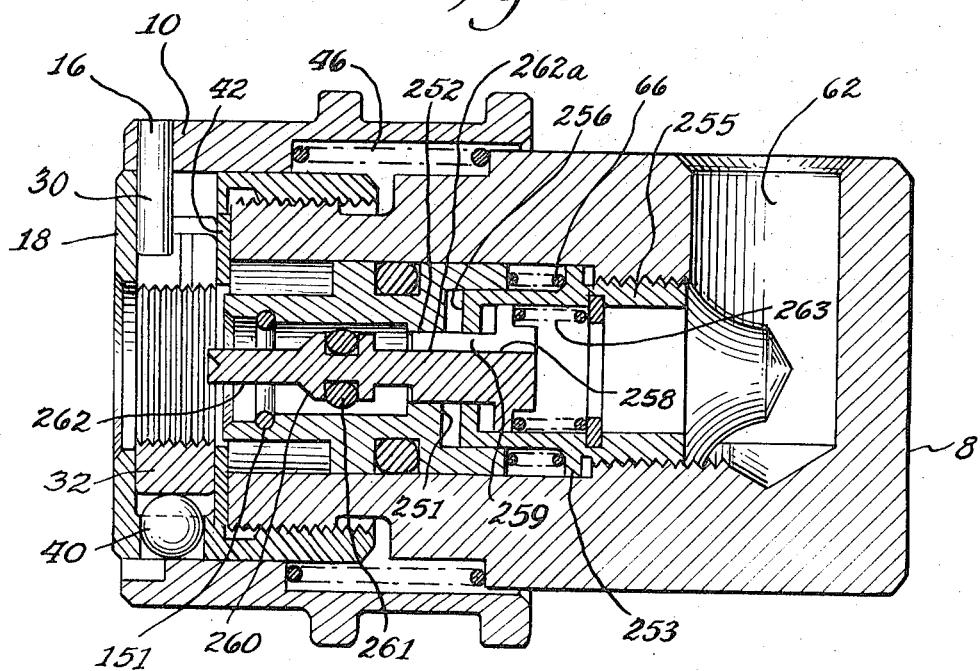
FIG. 3 is a sectional view similar to FIG. 1 while illustrating a different operative position of the parts from that illustrated in FIG. 1.

Pin 258 includes an enlarged cylindrical surface 260 intermediate the ends of the pin. This surface carries a seal ring 261 for sealing against the wall of the bore 252, when the pin is in an inoperative position as illustrated in FIG. 1. The pin has a reduced diameter on opposite sides of surface 260 as at 262 and 262a. When plunger 150 is moved to the right (FIG. 3), relative to pin 258, bore 252 moves over reduced diameter 262a and allows communication through the bore.

The pin 258 is biased toward the position illustrated in FIG. 1 by means of a spring 263. One end of spring 263 abuts against a retaining ring 264, which is fixed in a groove in the wall of the bore in the spring retainer while the other end abuts against the rear end of pin 258.

The assembly is especially adapted for situations wherein it is desired to use the connector itself as a means for starting and stopping flow through the connector. In this regard the valve defined by the O-ring 261 and the bore 252 is operative to close off flow through the connector when the actuating pin 258 is in the position illustrated in FIG. 1. When plunger 150, however, is moved to the right relative to the pin 258, it will open the connector for flow therethrough.

The assembly may be used, for example, in precharging refrigeration tubing. In this event, a refrigeration tube having a Schrader valve as aforementioned is inserted into the plunger whereupon the tube is sealed to the plunger by seal ring 151. As the tube is moved further inwardly, plunger 150 is forced inwardly to open the passage through bore 252 and the forward end 262 of pin 258 contacts the Scrader valve. Pin 258 may be forced inwardly somewhat against the bias of spring 263. During this movement the tubing remains sealed to the plunger. At or before the time that the tubing completes its inward movement, The Schrader valve is opened and thus opens the tubing for communication with fluid through passage 62. With the parts correctly positioned, sleeve 10 is released to thus close the collets 32 on the tube and hold it in place.

In the precharging operation, the refrigeration tubing may be initially subject to vacuum, after which a freon nitrogen mixture is pumped into the connector and into the assembly. Leakage tests may be made and then the initial pressure on the assembly reduced. The connector assembly may then be removed from the refrigeration tubing whereupon the Schrader pin in the tubing closes to hold the pressure to which the tubing was subjected. At the time of removal of the connector, plunger 150 moves to the left to thus close the valve defined by bore 252 and seal ring 261. At the time this valve closure is made, the Schrader valve will have closed in the refrigeration tubing and this closure occurs prior to the time that the tubing is removed from the seal ring 151.

The assembly may also be used for a final charging operation of refrigeration tubing. In this event the tubing and connector are assembled as described. A vacuum may be initially drawn on the tubing through the connecting assembly as described. After the vacuum is drawn, the tubing may be filled with a relatively high pressure freon-oil mixture. The tubing may be released from the connecting assembly whereupon the Schrader valve in the tube closes to maintain the pressure in the tubing, while the internal valve in the connecting assembly holds the pressure in the charging line.

I claim:

1. A tube connector comprising a head member having an opening in one end thereof to receive a tube, said head member having a plunger axially movable in a bore in said head member, said plunger having an outer end with means for receiving a tube in a sealing relation, said plunger having a first bore extended through said outer end and a second bore of reduced diameter spaced from said outer end, a valve actuating pin mounted for axial relative movement within said plunger, said pin including an enlarged portion intermediate its length, said enlarged portion being cooperable with the wall of said second bore to define a valve within said plunger, said pin having an actuating portion extending outwardly from said intermediate portion, means establishing communication through said head member and to a space on the side of said second bore opposite to said first named bore, said pin and plunger being movable relative to one another upon insertion of a tube within said plunger so as to move the wall of said bore relative to said enlarged portion of said pin to thereby establish communication through said second bore and first bore and to a tube carried by said plunger, and tube gripping means carried by said head member and radially spaced from said plunger for gripping a tube inserted within said head member and sealed to said plunger.

2. A tube connector as set forth in claim 1 characterized by and including resilient means for biasing said plunger toward said head member opening, and stop means within said head member for limiting movement of said plunger toward said open end.

3. A tube connector as set forth in claim 2 characterized by and including resilient means biasing said pin toward said open end of said head member while allowing yielding movement of said pin away from said open end, and stop means providing a normal position of said actuating pin, when said plunger is at its outer limit of movement, for positioning the enlarged portion of said pin in a valve closing engagement with the wall of said bore.

4. A tube connector as set forth in claim 2 wherein said first plunger bore includes a seal means therein for sealing a tube inserted therein.

5. A tube connector as set forth in claim 2 characterized by and including a cylindrical retainer positioned within a bore of said head member and positioned on the side of said plunger remote from the open end of said head member, said retainer having a transverse wall with a bore for slidably receiving a portion of said pin, said transverse wall providing an abutment for an annular shoulder on said pin to define a limit position of said pin relative to said retainer, said retainer including spring means therein for allowing a yielding movement of said pin through said second bore.

6. A tube connector as set forth in claim 5 wherein said pin has an opening formed therein to allow communication through the bore of the transverse wall of said retainer and through said pin.

7. A tube connector as set forth in claim 2 wherein said tube gripping means includes a sleeve carried by said head member and movable axially relative thereto and tube gripping elements carried by said head member and adapted to surround and grip a tube inserted within the open end of said head member, and means for moving said gripping elements radially inward towards a tube carried by said plunger in response to relative movement of said sleeve and head member.

8. A tube connector as set forth in claim 2 wherein said pin includes an elongated outer portion having a diameter such as to be received within a tube carried by said plunger when said plunger moves away from the open end of said head member.

* * * * *